United States Patent [19]

van Grinsven et al.

[11] Patent Number: 4,769,224

[45] Date of Patent: Sep. 6, 1988

[54] PROCESS FOR THE REMOVAL OF HYDROGEN CYANIDE FROM A GAS STREAM

[75] Inventors: Petrus F. A. van Grinsven; Gosse Boxhoorn; Pieter L. Zuideveld, all of Amsterdam, Netherlands

[73] Assignee: Shell Oil Company, Houston, Tex.

[21] Appl. No.: 27,150

[22] Filed: Mar. 16, 1987

Related U.S. Application Data

[63] Continuation of Ser. No. 912,137, Sep. 23, 1986, abandoned, which is a continuation of Ser. No. 732,215, May 9, 1985, abandoned.

[30] Foreign Application Priority Data

May 18, 1984 [GB] United Kingdom ............... 8412813

[51] Int. Cl.$^4$ ........................ C01C 3/00; B01J 8/00; C01B 17/16
[52] U.S. Cl. .................................. 423/236; 423/564; 423/244
[58] Field of Search ............. 423/236, 244 R, 244 A, 423/564

[56] References Cited

U.S. PATENT DOCUMENTS

| | | | |
|---|---|---|---|
| 2,743,153 | 4/1956 | Marsh et al. | 423/236 |
| 3,878,289 | 4/1975 | Beavon | 423/236 |
| 4,585,625 | 4/1986 | Chadwick et al. | 423/236 |

FOREIGN PATENT DOCUMENTS

| | | | |
|---|---|---|---|
| 2352425 | 5/1974 | Fed. Rep. of Germany | 423/236 |
| 53-5065 | 1/1978 | Japan | 423/236 |
| 54-18466 | 2/1979 | Japan | 423/236 |
| 1435619 | 5/1976 | United Kingdom . | |

OTHER PUBLICATIONS

J. Appl. Chem., Dec. 2, 1952, pp. 681–684.
Chem. and Process Eng., Feb. 1972, pp. 62–63.

Primary Examiner—Gregory A. Heller

[57] ABSTRACT

A process for removing HCN from gases, which may also contain a hydrogen halide, by hydrolysis in the presence of a supported metal from Group 3b and/or 4b, use being made of a silica-containing carrier or support.

16 Claims, No Drawings

PROCESS FOR THE REMOVAL OF HYDROGEN CYANIDE FROM A GAS STREAM

This is a continuation of application Ser. No. 912,137, filed 9/23/86, now abandoned, which is in turn a continuation of application Ser. No. 732,215, filed May 9, 1985, now abandoned.

BACKGROUND OF THE INVENTION

The invention relates to a process for the removal of hydrogen cyanide (HCN) from a gas stream.

Suitable gas streams from which hydrogen cyanide must be removed are coke oven gas and synthesis gas formed by partial combustion of a fuel containing carbon. These gases usually contain other purities, such as carbonyl sulphide, ammonia, hydrogen sulphide, and carbon dioxide. Partial combustion of a fuel containing halogen compounds yields a synthesis gas also containing, for example, from 100 to 1000 parts per million by volume of a hydrogen halide. As used herein, the term "halide" denotes a fluoride, chloride, bromide, or iodide.

Hydrogen cyanide and hydrogen halides must be removed from gas streams for a variety of reasons. For example, they may shorten the life of liquid absorbents that are used for removal of carbon dioxide and sulphur compounds from the gas stream, they may deactivate the catalysts being used in processes in which the gas stream is applied, and they may corrode steel equipment.

It has already been proposed to remove hydrogen cyanide by hydrolysis in the presence of solid catalysts. Hydrolysis of hydrogen cyanide proceeds according to the following equation:

$$HCN + H_2O \rightleftharpoons CO + NH_3$$

A disadvantage of the catalysts hitherto proposed is that their activity rapidly declines with time when the starting gas stream also contains a hydrogen halide. Accordingly, it is an object of the invention to remove very low amounts of hydrogen cyanide from gas streams, and to remove hydrogen cyanide from gas streams also containing a hydrogen halide. A further object of the invention is the simultaneous removal of hydrogen cyanide and carbonyl sulphide from a gas stream.

Accordingly, the invention provides a process for the removal of hydrogen cyanide from a gas stream comprising contacting the gas stream in the presence of water with a catalyst comprising at least one metal from Group 3b and/or Group 4b of the Periodic Table of the Elements and a silica-containing carrier or support, at a temperature in the range of from 200° C. to 500° C. By the practice of the invention, the content of hydrogen cyanide of a gas stream can be decreased to a value of less than 10 parts per million by volume (hereinafter also referred to as "ppmv"), with simultaneous removal of a substantial part of the carbonyl sulphide and carbon disulphide, if present, and it has been observed that the presence of a hydrogen halide in the gas stream hardly influences the catalyst, if at all. Carbonyl sulphide and carbon disulphide are hydrolyzed according to the following equations, respectively:

$$COS + H_2O \rightleftharpoons CO_2 + H_2S$$

$$CS_2 + 2H_2O \rightleftharpoons CO_2 + 2H_2S$$

The process of the invention is therefore quite suitable for the treatment of gas streams containing hydrogen cyanide, carbonyl sulphide, and carbon disulphide.

The Periodic Table of the Elements referred to herein is that shown on the inside cover of "Handbook of Chemistry and Physics", 63rd edition (1982–1983). The Group 3b metals mentioned hereinbefore are scandium, yttrium, thorium, and the lanthanides, i.e., lanthanum, cerium, praseodymium, neodymium, promethium, samarium, europium, gadolinium, terbium, dysprosium, holmium, erbium, thulium, ytterbium and lutetium. The Group 4b metals are titanium, zirconium and hafnium. Preferably, the metal from Group 3b and/or Group 4b of the Periodic Table of the Elements is applied as an oxide or salt thereof, for example, as a sulphate or chloride. Most preferably, at least one oxide of titanium, zirconium and/or thorium is applied on the carrier. These oxides are themselves active catalysts, or are converted to active catalysts in contact with the starting gas. Very good results have been obtained with titanium dioxide and zirconium dioxide.

The metals from Group 3b and/or Group 4b are applied in an atomic ratio of metals to silicon which can be varied. As a rule, atomic ratios of metal to silicon in the range of from 0.001 to 1.0 are preferred, atomic ratios in the range of from 0.03 to 0.3 being particularly preferred.

Suitably, at least 50 percent by weight of silica is applied in the silica-containing carrier. Preferably, at least 75 percent and, most preferably, at least 90 percent by weight of silica is applied in the carrier. Among the synthetic silicas commercially available, those containing at least 98.0 percent by weight of silica are generally the most suitable.

According to a very attractive embodiment of the present invention, a silica is used which has been prepared by the following process steps:

step (a) preparing a silica hydrosol by mixing an aqueous solution of an alkali metal silicate with an aqueous solution of an acid;

step (b) converting the hydrosol into droplet form;

step (c) shaping the droplets in air or in a liquid which is not miscible with water;

step (d) partially pre-drying the hydrogel particles obtained;

step (e) subjecting the partially pre-dried particles to a hydrothermal treatment;

step (f) decreasing the cation content of the hydrogel particles thus treated in an aqueous medium to less than 10 percent by weight, calculated on dry material, and step (g) drying and optionally calcining the silica particles thus obtained.

The silica thus prepared has a very high attrition resistance and a very high mean side crushing strength. A description of this method of preparation is found in European patent application No. 0067459. A suitable way of preparing the catalyst composition comprises incorporating a compound or compounds of a Group 3b and/or Group 4b metal into the silica when the silica is being prepared, for example, during step (a) or subsequent to step (f), and prior to step (g). If desired, a portion of the compound or compounds may be incorporated into the silica during step (a), and the balance subsequent to step (f), and prior to step (g).

The catalyst composition may further be prepared by such conventional techniques as, for example, dry-mixing, followed by calcination, cogellation, co-precipitation, impregnation, and ion-exchange. For example, a mixture of titanium salt and a silica salt may be co-gelled, the material then being dried and ground to an appropriate size, or the co-gelled material may be slurried and spray-dried. However, the catalyst composition may, for example, also be prepared by reacting the hydroxyl groups at the surface of a silica with a titanium salt by the procedure described in U.S. Pat. Nos. 3,166,542, 3,220,959 or 3,274,120, thus producing catalyst compositions in which titanium is in chemical combination with silica. Examples of suitable titanium salts are titanium tetrachloride, titanium oxalate, and titanyl sulphate (TiOSO$_4$), the latter dissolved in a mixture comprising sulphuric acid and water. In yet another technique, a fumed pyrogenic catalyst, in particular, a pyrogenic titania-silica composition is prepared by combustion of hydrogen and oxygen with a mixture of silicon tetrahalide and titanium halide, "halide" referring to fluoride, chloride, bromide or iodide.

Another suitable way of preparing the catalyst composition comprises impregnating silica with a substantially non-aqueous solution of a titanium compound in a non-basic, essentially inert, oxygen-substituted hydrocarbon as a solvent; removing solvent from the impregnated silica; and calcining the impregnated silica, again producing catalyst compositoins in which titanium is in chemical combination with silica. A description of this method of preparation is found in British Pat. No. 1,332,527.

The catalyst composition may be subjected to a pre-treatment prior to utilization in the process. As a rule, it is preferable to do so in order to obtain a higher activity. The pre-treatment suitably consists in heating the catalyst composition in an atmosphere of non-reducing gas, such as, for example, nitrogen, argon, CO$_2$, or of a free oxygen-containing gas, such as, for example, air. However, the most suitable method of pre-treatment, in general, depends upon the form of chemical combination in which the metal compound is provided. In many instances, titanium compounds must be converted into the oxide. This conversion may, as a rule, suitably be effected by heating in a non-reducing atmosphere, at temperatures in the range of from 250° C. to 800° C. from a period of from 1 to 18 hours.

The catalyst composition may be used according to the invention in any convenient physical form, for example, as a powder, as flakes, spheres or pellets. Very good results have been obtained with spheres.

The silica-containing carrier has a pore volume and a surface area which are not critical, and which may vary within wide limits. Suitably, the pore volume is greater than 0.25 ml/g, and preferably greater than 0.50 ml/g, determined by absorption of liquid water. Silicas having such large pore volumes are also very attractive in view of their low particle density, i.e., the density of a given particle including the volume of the silica skeleton and of the pores. Silica supports having a predetermined pore volume can be manufactured, as described in European patent application No. 0067459. The amount of water remaining in the partially pre-dried hydrogel subsequent to step (d) mentioned hereinbefore appears especially to determine the pore volume. Suitably, the surface area of the catalyst is at least 25 m$^2$/g, and preferably at least 100 m$^2$/g.

The process of the invention is preferably carried out at a temperature of from 225° C. to 350° C. The space velocity may be varied within a wide range, and is preferably from 500 to 5000 normal volumes (at 0° C. and 1 bar) of gas per unit volume of catalyst per hour, with temperature and space velocity being adjusted to achieve the percentage of hydrogen cyanide removal desired.

As indicated, the origin of the gas stream from which hydrogen cyanide is to be removed is not critical. Very suitable gas streams have been obtained by partially combusting a fuel containing carbon to synthesis gas by means of a gas containing oxygen, and cooling the synthesis gas. The fuel may be liquid, but is preferably a solid, such as coal. It has been observed that the catalyst used in the process according to the present invention does not catalyze the reaction $CO + H_2O \rightleftharpoons CO_2 + H_2$.

After the fuel has reacted with the oxygen, the synthesis gas formed leaves the reactor at a temperature of 1200° C. to 1700° C. Apart from impurities, the synthesis gas entrains slag droplets. The hot gas is suitably rapidly cooled to a temperature of 700° C.–900° C. by injecting cold gas or a cold liquid. As a result of the rapid cooling, the slag droplets quickly solidify to solid particles. The cooled synthesis gas is then further cooled to 100–500° C., and the solid slag particles are removed from the gas, for example, with the aid of a bag filter. The gas may then be subjected to the process of the invention, and following this procedure, the gas is passed to any conventional system for the removal of ammonia, hydrogen halides, and hydrogen sulphide.

The invention is further illustrated by way of the following examples.

EXAMPLES 1–6

An amount (bulk volume 500 ml, weight 223.3 g) of silica gel spheres (pore volume 1.02 ml/g, surface area 260 m$^2$/g) was impregnated with tetraisopropylorthotitanate (135.74 g, to which 2-propanol had been added until the volume of the solution was 234.5 ml) under nitrogen of atmospheric pressure. The impregnated spheres were dried at a temperature of 110° C., and the temperature of the dried spheres was increased to 250° C. at a rate of 100° C./h and to 500° C. at a rate of 50° C./h. The temperature was kept for one hour at 500° C., increased at a rate of 50° C./h to 550° C., and kept for 3 h at 550° C. The spheres were then allowed to adopt ambient temperature. The catalyst thus prepared had an atomic ratio Ti:Si of 0.08, a pore volume of 0.87 ml/g (measured with N$_2$), and a surface area of 299 m$^2$/g.

A cylindrical tube having an inside diameter of 2.0 cm was charged over a height of 22.3 cm with a fixed bed of the catalyst. A gaseous feed consisting of nitrogen, water, and hydrogen cyanide, composed as shown in Table 1, was conducted in downflow and at atmospheric pressure through the fixed bed. Conditions of operation are shown more specifically in Table 1.

TABLE 1

| Example | Temperature °C. | G.H.S.V.[1] NM$^3$/(m$^3$)(h) | Gaseous feed H$_2$O volume | HCN ppmv | Conversion of HCN, % |
|---|---|---|---|---|---|
| 1 | 235 | 3000 | 5 | 213 | 81 |
| 2 | 250 | 3000 | 5 | 187 | 84 |
| 3 | 250 | 3000 | 8 | 220 | 91 |
| 4 | 300 | 1500 | 5 | 196 | 99 |
| 5 | 250 | 1500 | 5 | 198 | more than 99 |

TABLE 1-continued

| Example | Temperature °C. | G.H.S.V.[1] NM³/(m³)(h) | Gaseous feed | | Conversion of HCN, % |
|---|---|---|---|---|---|
| | | | H₂O volume | HCN ppmv | |
| 6 | 250 | 1500 | 12 | 233 | more than 99 |

[1] gas hourly space velocity

Table 1 shows that significant HCN conversion is obtained.

COMPARATIVE EXPERIMENT A

Example 5 was modified, in that the catalyst was replaced with pure $TiO_2$ having a surface area of 35 m²/g, and the gaseous feed contained 207 ppmv HCN. The conversion of HCN was only 40%.

COMPARATIVE EXPERIMENT B

Example 4 was modified in that the catalyst was replaced with pure $TiO_2$ having a surface area of 35 m²/g, and the gaseous feed contained 188 ppmv HCN. The conversion of HCN was only 80%.

EXAMPLES 7-11

Five experiments were carried out, using the temperatures, gas hourly space velocities and feed compositions stated in Table 2. The feed composition has been calculated on water-free gas. In the six experiments, the gaseous feed contained 5% by volume of water, and was passed at a space velocity of 1500 Nm³ per m³ of catalyst per hour through the catalyst bed. The feed was conducted through a bed of the same dimensions and containing the same catalysts as used for Examples 1-6. Table 2 represents the results.

TABLE 2

| Example | Temperature °C. | Gaseous feed, % by volume | | | | | | Gaseous feed, ppmv | | | Conversion, %, of | |
|---|---|---|---|---|---|---|---|---|---|---|---|---|
| | | CO | H₂ | N₂ | CO₂ | H₂S | COS | HCN | NH₃ | HCl | COS | HCN |
| 7 | 235 | 71.9 | 25.2 | 1.8 | 0 | 0.72 | 0.16 | 329 | 469 | 0 | 31 | 85 |
| 8 | 270 | 67.4 | 25.9 | 0.9 | 5.4 | 0.35 | 0.07 | 312 | 272 | 0 | 57 | 97 |
| 9 | 300 | 67.7 | 24.8 | 0.6 | 5.7 | 0.93 | 0.18 | 321 | 282 | 0 | 78 | 99 |
| 10 | 273 | 67.3 | 26.9 | 1.15 | 4.1 | 0.29 | 0.07 | 320 | 266 | 44 | 29 | 96 |
| 11 | 250 | 68.0 | 26.4 | 1.0 | 4.1 | 0.25 | 0.07 | 317 | 168 | 64 | 14 | 85 |

The results of Examples 10 and 11 show that the presence of hydrogen chloride hardly has any influence on the conversion of hydrogen cyanide, if at all, and those of Examples 7-9 that, simultaneously, an appreciable portion of the carbonyl sulphide is converted.

An analysis of the gas withdrawn from the catalyst bed showed that the reaction $CO + H_2O \rightleftharpoons CO_2 + H_2$ had not taken place in the bed.

What is claimed is:

1. A process for the removal of hydrogen cyanide from a gas stream comprising contacting the gas stream in the presence of water with a catalyst comprising at least one metal selected from the metals of Group 3b and Group 4b of the Periodic Table of the Elements and a silica-containing carrier at a temperature of from 200° C. to 500° C., the metal or metals in the catalyst being in an atomic ratio of metal or metals to silicon of from 0.001 to 1.0.

2. The process of claim 1 in which the metal or metals are applied as oxide or salt thereof.

3. The process of claim 2 in which at least one oxide or salt selected from titanium, zirconium and thorium is applied to the carrier.

4. The process of claim 3 in which the atomic ratio of metal or metals to silicon is from 0.03 to 0.3.

5. The process of claim 4 in which at least 75 percent by weight of the carrier is silica.

6. The process of claim 5 in which at least 90 percent by weight of the carrier is silica.

7. The process of claim 5 in which the temperature is from 225° C. to 350° C.

8. The process of claim 7 in which the space velocity is from 500 to 5000 normal volumes of gas per unit volume of catalyst per hour.

9. The process of claim 7 in which the gas stream is a synthesis gas which has been obtained by partially combusting a fuel containing carbon with a gas containing oxygen and cooling the gas produced.

10. The process of claim 9 in which the fuel is coal.

11. The process of claim 10 in which the gas stream also contains hydrogen chloride.

12. The process of claim 9 in which the gas stream is contacted with the catalyst after solid slag particles have been removed from the synthesis gas.

13. The process of claim 8 in which the gas stream also contains carbonyl sulphide or carbon disulphide.

14. The process of claim 6 in which the gas stream is a synthesis gas which has been obtained by partially combusting coal.

15. The process of claim 14 wherein the temperature is from 225° C. to 350° C.

16. The process of claim 15 wherein the space velocity is from 500 to 5000 normal volumes of gas per unit volume of catalyst per hour.

* * * * *